United States Patent
Jain et al.

(10) Patent No.: US 11,188,880 B2
(45) Date of Patent: Nov. 30, 2021

(54) EVENT SETTINGS CONTROL FOR ONLINE COMMUNICATION EVENTS

(71) Applicant: Microsoft Technology Licensing, LLC, Redmond, WA (US)

(72) Inventors: Neeraj Kumar Jain, Prague (CZ); Philipp Steinacher, Berlin (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 16/547,934

(22) Filed: Aug. 22, 2019

(65) Prior Publication Data
US 2021/0056514 A1  Feb. 25, 2021

(51) Int. Cl.
*H04L 29/06* (2006.01)
*G06Q 10/10* (2012.01)
*G06F 16/955* (2019.01)
*H04L 29/08* (2006.01)
*H04L 9/32* (2006.01)
*H04N 7/15* (2006.01)

(52) U.S. Cl.
CPC ..... *G06Q 10/1095* (2013.01); *G06F 16/9558* (2019.01); *H04L 9/32* (2013.01); *H04L 63/104* (2013.01); *H04L 67/306* (2013.01); *H04N 7/155* (2013.01)

(58) Field of Classification Search
CPC . H04L 67/306; H04L 63/104; H04L 65/4015; H04L 65/403; H04L 9/32; G06Q 10/1095; G06Q 10/109; H04N 7/155; G06F 16/9558
See application file for complete search history.

(56) References Cited

U.S. PATENT DOCUMENTS

| | | |
|---|---|---|
| 8,798,252 B2 | 8/2014 | Krantz et al. |
| 8,886,720 B2 | 11/2014 | Serr et al. |
| 2016/0307165 A1 | 10/2016 | Grødum et al. |
| 2019/0273767 A1* | 9/2019 | Nelson ................ H04L 65/4015 |
| 2019/0362317 A1* | 11/2019 | Rogynskyy ......... G06F 16/2386 |
| 2019/0370026 A1* | 12/2019 | Schutzman ............ G09B 19/00 |
| 2019/0386839 A1* | 12/2019 | Kosugi ................. G06F 9/5016 |
| 2019/0392395 A1* | 12/2019 | Valliani ................ G06Q 10/109 |
| 2020/0145532 A1* | 5/2020 | Hassan ............. H04M 1/72454 |
| 2021/0014287 A1* | 1/2021 | Kimball ................ H04L 65/403 |

OTHER PUBLICATIONS

"Creating HTML Meeting Invitations", Retrieved from: https://support.vidyocloud.com/hc/en-US/articles/115000207733-Creating-HTML-Meeting-Invitations, Retrieved Date: Jul. 2, 2019, 10 Pages.

(Continued)

*Primary Examiner* — Jungwon Chang
(74) *Attorney, Agent, or Firm* — Schwegman Lundberg & Woessner, P.A.

(57) ABSTRACT

Techniques for providing access to event settings for a scheduled online communication event are disclosed herein. A hyperlink may be included in an invitation for the scheduled online communication event. Selection of the hyperlink can cause an interface to be generated allowing one or more event settings for the scheduled online communication event to be updated through the interface. The online communication event may be updated with the updated settings prior to, or during, execution of the online communication event.

20 Claims, 7 Drawing Sheets

(56) References Cited

OTHER PUBLICATIONS

"Updating 'Advanced Meeting Options' for meetings scheduled using Windows Outiook Plugin", Retrieved from: https://support.bluejeans.com/s/article/Updating-Advanced-Meeting-Options-for-meetings-Outlook, Jun. 5, 2019, 02 Pages.

"Prompted for Username and Password when Joining a Webex Meeting", Retrieved from: https://help.webex.com/en-us/WBX487/Prompted-for-Username-and-Password-when-Joining-a-Webex-Meeting, Retrieved Date: Jul. 2, 2019, 02 Pages.

"Assigning a Delegate", Retrieved from: https://docs.aws.amazon.com/chime/latest/ug/delegates.html, Retrieved Date Jul. 2, 2019, 03 Pages.

"Adjust Zoom settings for standard meetings", Retrieved from: https://web.archive.org/web/20190614170851/https://kb.iu.edu/d/aobu, Jun. 14, 2019, 03 Pages.

"HTML Drag and Drop API", Retrieved From: https://web.archive.org/web/20210708010340/https://www.w3schools.com/html/html5_draganddrop.asp, Jul. 8, 2021, 8 Pages.

"HTML5", Retrieved From: https://web.archive.org/web/20210704115506/https://en.wikipedia.org/wiki/HTML5, Jul. 4, 2021, 16 Pages.

* cited by examiner

EVENT SETTINGS

YOU ARE NOT AUTHORIZED TO ACCESS EVENT SETTINGS.
PLEASE CONTACT THE EVENT ORGANIZER

FIG. 3B

EVENT SETTINGS CONTROL FOR ONLINE COMMUNICATION EVENTS

TECHNICAL FIELD

This document pertains generally, but not by way of limitation, to online communication events, and particularly but not by way of limitation to control of event settings for online communication events.

BACKGROUND

Several applications exist for users to schedule and hold online communication events, such as online video conferences, for example. Settings for these communication events are often customizable. Between the time of scheduling the online communication event and the time of holding the event, it may be desirable to adjust the settings of the event. This may be difficult without access to a computing device installed with a native client application for the online communication event.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIGS. 3A and 3B are diagrams illustrating an example interface through which settings of an online communication event can be controlled.

DETAILED DESCRIPTION

Systems and methods are disclosed herein that facilitate control of settings for online communication events from remote devices. An online communication event, such as video conferences, teleconferences, web meetings, online chats, or the like can include initial settings including sharing permissions, access permissions, participation permissions, dial-in settings, video settings, audio settings, chat settings, and/or display settings, for example. Prior to holding the communication event, it may be desirable to update these initial settings. When scheduling the online communication event, an application, which may be an email client, communication event client, calendar client, or the like, may generate an invitation, for example, that includes a hyperlink or other selectable interface feature. The hyperlink may embed information regarding the scheduled online communication event such as one or more identifiers that identify the scheduled online communication event. The invitation may be transmitted to invitees of the event via electronic mail (e-mail), online message, text message, or the like.

One or more applications running on one or more servers may receive access requests through selection of the hyperlink. The access request may pass the identifiers to the server and the applications running on the server can verify an account attempting to access the event settings. In some examples, access may be granted for an organizer account of the event and accounts designated by the organizer account. The applications can access settings for the event using the event identifier and generate graphical user interface (GUI) descriptors, for example, that can be transmitted to a computing device to generate an interface, such as a web interface, for example. The computing device may be a laptop or desktop computer, a tablet, a phone, a wearable device, or the like. A user of the computing device can then adjust settings of the meeting through the interface. The updated settings are received by the applications running on the servers, which can update the event settings. These settings can be updated prior to, or during, the scheduled online communication event.

Figure 1:
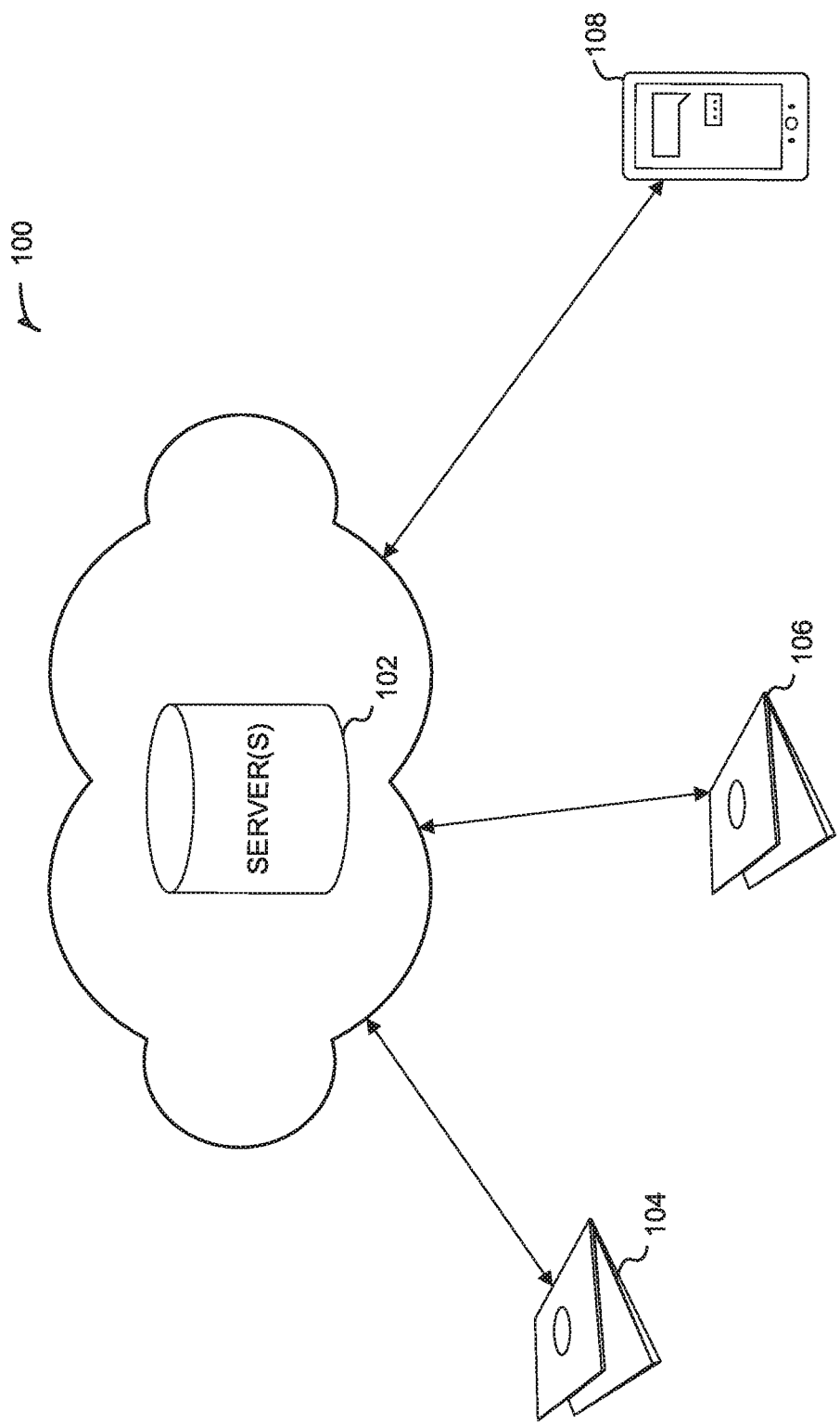
FIG. 1 is a network diagram illustrating an example system including computing devices connected to one or more servers.

FIG. 1 is a network diagram illustrating an example system 100 that includes computing devices connected to one or more servers 102. While the system 100 is illustrated as including two laptop computing devices 104 and 106, and a mobile device 108, the system 100 may include any number of computing devices including laptop and desktop computers, tablets, phones, wearable devices, and the like. Servers 102 may include any number of servers implemented on any number of computing systems. The computing devices 104, 106, and 108 may be connected to communicate with the servers 102 over wired and/or wireless network connections including ethernet, Wi-Fi®, cellular, and the like.

One or more of the computing devices 104, 106, and 108 may be configured to execute one or more online communication applications that facilitate video conferencing, teleconferencing, online chat, web meetings, and the like. In one example the online communication application may be a Microsoft® Teams client. One or more of the computing devices 104, 106, and 108 may also be configured to execute one or more scheduling applications which may include email clients, calendar applications, and the like. In other examples, users of the computing devices 104, 106, and 108 may also access online scheduling software through one or more web browser applications, for example.

A user of one of the computing devices, such as the computing device 104, may schedule an online communication event using an application executing on the computing device 104. The application may be configured to generate an event invitation. In other examples, applications running on the servers 102 may generate the event invitation upon receipt of the scheduled online communication event. The invitation may be provided to invitees through electronic mail, through the online communication client, through a messenger application, via text message, or the like. In one example, the scheduled event may be provided to the servers 102 from the client application running on the computing device 104, for example. The servers 102 execute one or more applications to store details regarding the scheduled event including an event organizer, start and end times, event location, dial-in settings, and event settings. The event settings may include sharing permissions, access permissions, participation permissions, dial-in settings, video settings, audio settings, chat settings, display settings, and the like. In one example, applications running on the servers 102 may also generate and transmit the invitations to the invitees of the event. In another example, the device 104 running the scheduling application may directly transmit the invites to the invitees of the event.

Figure 2:
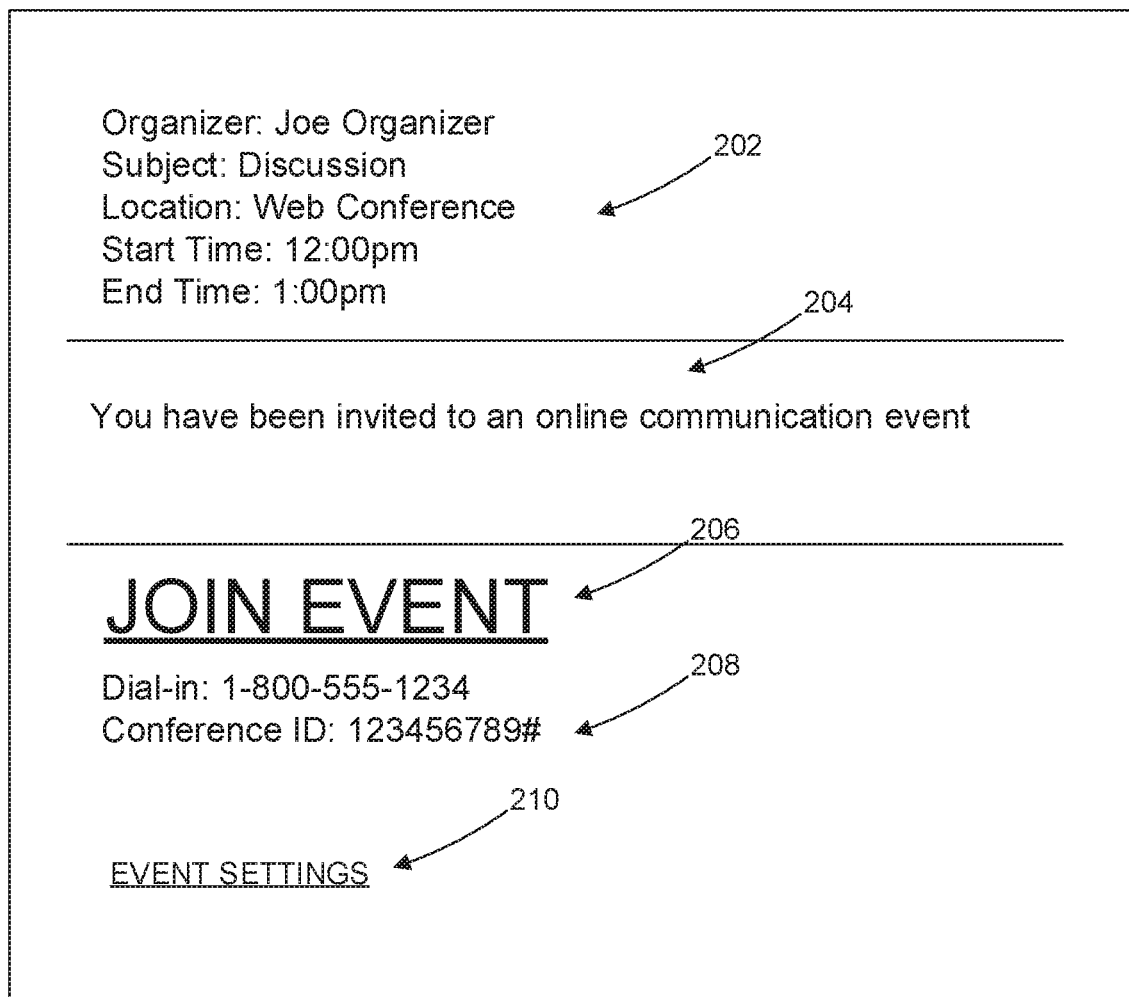
FIG. 2 is a diagram illustrating an example invite for an online communication event.

FIG. 2 is a diagram illustrating an example invite 200 for an online communication event. The invite 200 includes event details 202, event body 204, event launch hyperlink 206, event connection information 208, and event settings hyperlink 210. The event details 202 may include information regarding the scheduled communication event including an event organizer, event subject, event location, event start and end times, and the like. The event body may include text, for example, providing further description for the event. The event body may be input by the event organizer, for example, when scheduling the event.

The event launch hyperlink 206 may be selectable by a user to launch an event application to access the online communication event. For example, a user may select the hyperlink 206 through an input device such as a mouse, keyboard, touchscreen, or the like. The hyperlink 206 may launch a client-side event application, a web-based application, or the like. The event connection information 208 may be information allowing a user to dial-in to the online communication event through a telephone, for example, such as over a voice over Internet Protocol (VoIP) connection, a public switched telephone network (PSTN), cellular network, or the like.

The event settings hyperlink 210 may be included in the invite 200 to allow one or more users to access settings for the scheduled event from any computing device. For example, a user of the mobile device 108 in FIG. 1 may select the event settings hyperlink 210 through a touchscreen or other input device. The hyperlink 210 may include a uniform resource locator (URL) or other web address, which may also be embedded with event information. The event information embedded in the hyperlink 210 may include one or more indicators specifying the scheduled event, for example.

Selection of the hyperlink 210 may launch a web browser or other respective application on a respective computing device, for example. In an example, the web browser application may transmit the embedded indicators to the servers 102, for example. The servers 102 may then access the event information stored for the respective scheduled event. For example, the event information may be stored in one or more databases, and the embedded indicators may be used by the servers 102 to index into the database to obtain the event information for the respective scheduled event.

In an example, the event settings hyperlink 210 may be different than the event launch hyperlink 206. Put another way, the event settings hyperlink 210 may not be the event launch hyperlink 206. In another example, the event settings hyperlink 210 may be the same link as the event launch hyperlink 206. In this example, settings or the event may be launched when the link is selected, such as according to user privileges or time (e.g., near the event, launch the event, but before the event, such as more than an hour or day before the event, launch the settings).

Figure 3A:
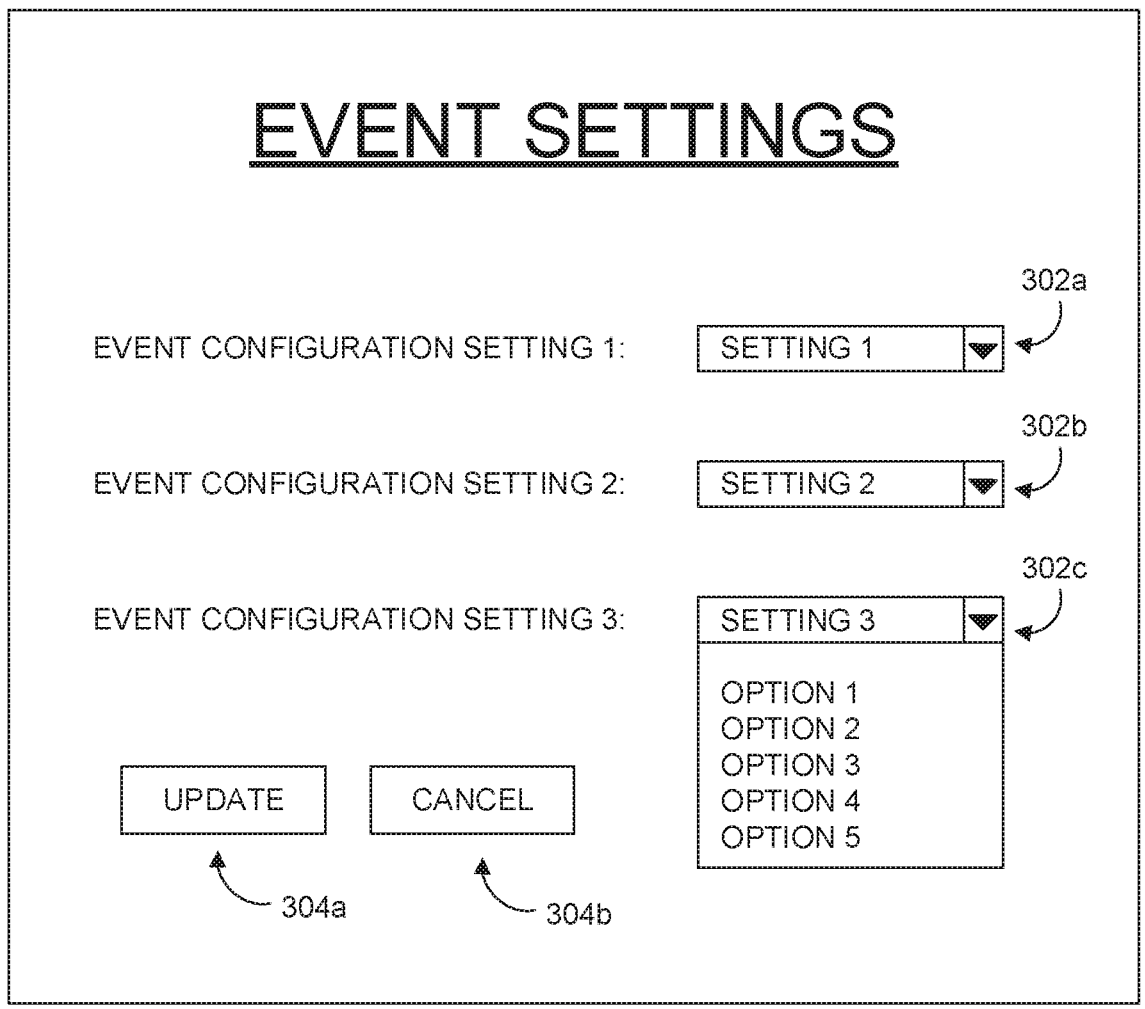

FIGS. 3A and 3B are diagrams illustrating respective example interfaces 300 and 350 through which settings of an online communication event can be controlled. The interfaces 300 and 350 may be presented to a user through a web browser or other application on a computing device, for example, such as the computing devices 104, 106, and 108 of FIG. 1. The servers 102, for example, may generate GUI descriptors using the event information for a respective scheduled event. The GUI descriptors may be code generated using Hypertext Markup Language (HTML), cascaded stylesheets (CSS), Java, Javascript, PHP, or the like. The GUI descriptors can be transmitted from the servers 102 to a respective computing device 104, 106, or 108 to display the interfaces 300 and 350 to a user through a web browser application, for example. In other examples, the GUI descriptors may be in a proprietary coding language that can be interpreted by a client-side application running on the computing devices 104, 106, or 108 to display a user interface to a user.

It may be desirable to only provide event setting controls to authorized users, so the servers 102 may also prompt a user for access credentials. If a user is already logged into an account for the event software, the account credentials may be automatically sent to the servers 102 by the web browser application, for example. Otherwise, a user may enter account credentials which can be forwarded to the servers 102. The servers 102 may compare the received account credentials with account credentials of authorized users. The authorized account credentials may be accessed from one or more databases, for example, using the event identity information embedded in the hyperlink 210. Authorized users may be an event organizer, accounts delegated by the event organizer, or any other accounts for which it may be desirable to provide control of event settings for the online communication event.

If the account is verified, the interface 300 may be presented to the user, and if the account is not verified, the interface 350 may be presented to the user. The interface 300 includes event setting controls 302a-302c. While illustrated as three event setting controls, any number of event setting controls may be included in the interface 300. Each event setting control 302a-302c may allow a user to adjust a setting of a respective scheduled online communication event. Event settings may include sharing permissions, access permissions, participation permissions, dial-in settings, video settings, audio settings, chat settings, display settings, and the like. While illustrated as dropdowns, any other input fields may be included such as radio buttons, text fields, selectable features, and the like. The interface may also include one or more input 304a and 304b to confirm and/or cancel selection of event settings.

Example event settings may include lobby settings of VoIP endpoints, lobby settings of PSTN endpoints, allowing video in meeting allowing chat in meeting, selecting a default bridge number, selecting designated presenters, automated announcements in meeting, allowing recording in meeting, or the like. Modifications to event settings may be applied instantly, for example when an event is in progress. In an example, event settings may be set to a default initially, such as by an organization's IT team. Changes to the event settings for a particular user (whether made by the user or by a delegate of the user) may be saved for future use by the user (or by the delegate).

In another example, a scheduling application or application for the online communication event may include the interfaces 300 and 350 as an embedded settings interface. For example, the interfaces 300 and 350 may be accessed through the scheduling and/or online communication event application through an embedded web interface. A settings link or other interface feature similar to the hyperlink 210 may be included in the scheduling and/or online communication event application that allows access to the interfaces 300 and 350 for a respective online communication event. The settings link or other interface feature may be selected by a user to launch the embedded web interface to access the interfaces 300 and 350, for example, through the scheduling and/or online communication event application to adjust event settings for a respective online communication event. The settings may be updated in the same or a similar manner as through a web browser, for example. This way, users can update the settings through the meeting invite without client software, or directly through the client software, using the same backend interface. This is advantageous in that it allows the same interface to be used for updating event settings through both a web application as well as client applications, resulting in a unified and consistent experience for end-users regardless of the application used, and resulting in engineering savings by utilizing the same settings interface for all settings updates.

Figure 4:
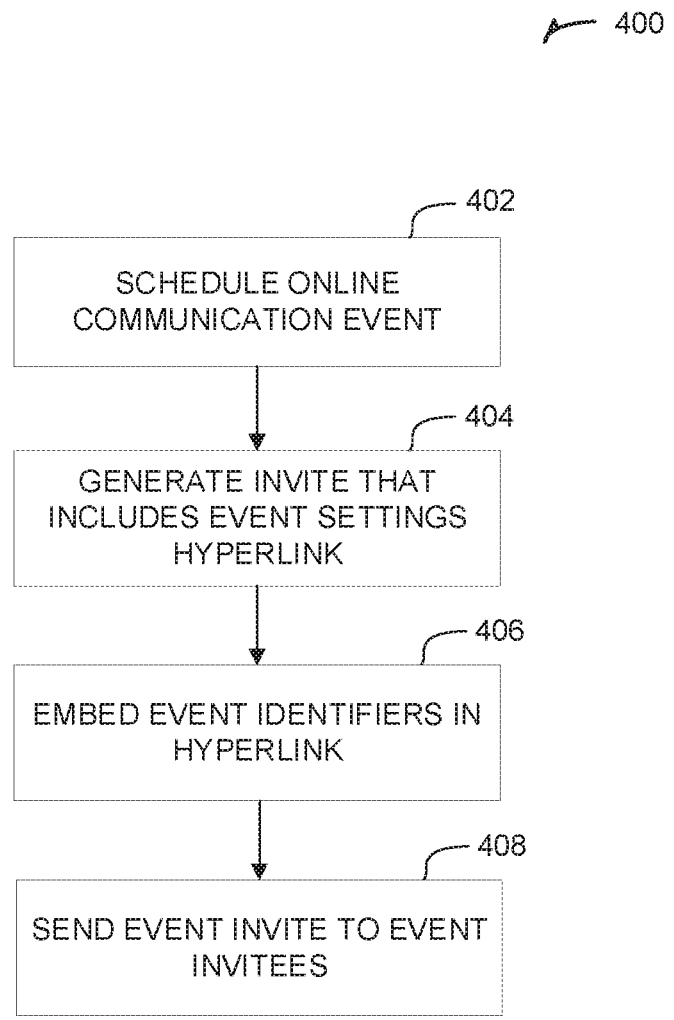
FIG. 4 is flowchart illustrating a method of generating an invite for an online communication event that includes an event settings hyperlink.

FIG. 4 is flowchart illustrating a method 400 of generating an invite, such as the invite 200, for an online communication event that includes an event settings hyperlink, such as the hyperlink 210. At step 402, an online communication event is scheduled. This may be through a computing device, such as the computing devices 104, 106, or 108 illustrated in FIG. 1. The communication event may be scheduled using a scheduling application, such as an email client, the event client, a calendar application, or the like.

At step 404, an event invitation is generated for transmission to the invitees of the event. This invitation may be transmitted through e-mail, online messaging, an online chat application, text message, or the like. The invitation may be of the form illustrated in FIG. 2, or may be of any other form. The invitation may include information regarding the event, such as the organizer, start time, end time, location, description, dial-in information, and the like.

The invitation may also include a hyperlink or other selectable interface feature, such as the hyperlink 210 illustrated in FIG. 2. At step 406, event identifiers are embedded within the hyperlink. The event identifiers may include one or more indicators that can be used to identify a respective online communication event. For example, the event identifiers may be a meeting ID number that a server may associate with each instance of an online communication event. This way, the server can use the meeting ID number to obtain details regarding a respective online communication event from a database, for example.

At step 408, the invitation is sent to all event invitees. The invitation may be sent through email, online messaging, an online chat application, text message, or the like. In one example, the invitation may be added to a scheduling or calendar application in which a user can access the details of the invitation at a later time. The invitation may be transmitted by the servers 102, or directly by a computing device 104, 106, or 108. In an example, the event may be modified using a different device or application (including, for example a mobile app) than a device or application used to initially setup the event. For example, the event may be initiated using a meeting client app, and then modified at a device without the meeting client app installed (e.g., by using a web browser instead).

Figure 5:
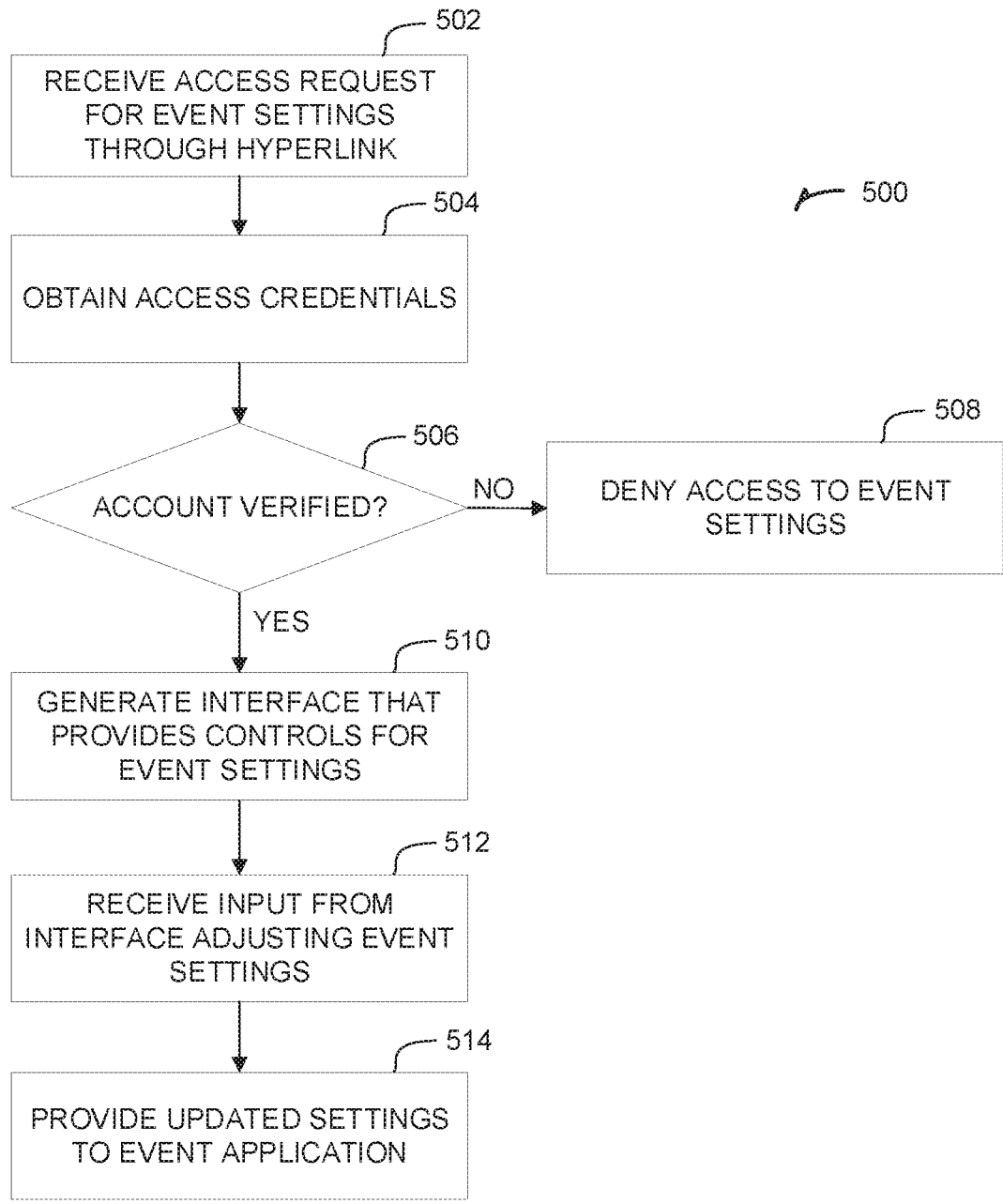
FIG. 5 is a flowchart illustrating a method of providing access to event settings for a scheduled online communication event.

FIG. 5 is a flowchart illustrating a method 500 of providing access to event settings for a scheduled online communication event. At step 502, an access request is received through selection of a hyperlink in an event invite, for example, such as the hyperlink 210. The access request may be received by one or more applications running on one or more servers, such as the servers 102 in FIG. 1. For example, a user may click, or otherwise select, the hyperlink, which may establish a connection to a server executing the one or more applications. In one example, the connection may be established through a web browser application operating on a computing device of the user. The web browser application may connect to the one or more applications through a URL, or other address embedded in the hyper link.

The one or more applications may obtain an event identifier also embedded in the hyperlink, such as an event ID number, which may be used to index into a database, for example. This way, the one or more applications can access event settings and account permissions data, for example, for a respective event.

Prior to providing access to event settings for a respective online communication event, the one or more applications running on the server may verify that an account attempting to access the event settings has permission to access the event settings. The server may use the event identifiers embedded in the hyperlink to obtain account permissions information for a respective event. The account permissions may define one or more accounts that have permission to change meeting settings, including credentials for those accounts. The account permissions can also include further parameters, such as defining which settings an account has permission to change allowing different users to have access to change different settings. In some examples, the account permission may indicate that an event organizer and accounts delegated by the event organizer have permission to change event settings.

At step 504, the applications run by the server receive access credentials for an account that selected the hyperlink, for example. This may be provided automatically by the web browser application, for example, if a user is already logged into a respective account. In another example, a prompt may be generated and displayed through the web browser application to allow a user to enter access credentials. At step 506, the application run by the server may compare the received access credentials to the account permissions for the online communication event to determine if the respective account is permitted to access the event settings. If the account has permission, the method 500 proceeds to step 510 and if not, the method 500 proceeds to step 508 and denies access to the account.

A step 510, an interface is generated for updating event settings. This may be accomplished by the server through generation of graphical user interface (GUI) descriptors, for example, that can be transmitted to the computing device for display to a user. The GUI descriptors may be code that can be transmitted to the computing device and interpreted by an application executed on the computing device to present a user interface to the user. In one example, the code may be Hypertext Markup Language (HTML), cascaded stylesheets (CSS), Java, Javascript, PHP, or the like, and the application on the computing device may be a web browser application, for example. In other examples, code using any language, including proprietary code for a client application running on the computing device, may be generated by the server and transmitted to the computing device for display of an event settings interface to a user.

The interface, which may be similar to the interfaces 300 and 350 illustrated in FIGS. 3A and 3B, may be presented to the user to allow a user to update settings for a respective online communication event. At step 512, input is received from a user through the generated interface. This may be received through one or more interface features, such as text fields, radio buttons, dropdowns, or any method of providing a selection of an event setting. The setting selections made by the user through the interface may be sent to the applications running on the server. The application on the server can then update settings stored in the database for the online communication event, for example, or may provide the settings to a separate application for the event.

At step 514, updated event settings are provided to an application that handles execution of the online communication event. In some examples, the servers that handle the event settings requests through the hyperlink may be the same servers that handle execution of the online communication event. In other examples, different servers or computing devices may handle execution of the online communication event, in which case the updated settings can be transmitted to the different servers or computing devices that handle execution of the online communication event.

Updated settings can be provided to the event execution software prior to, or during, the online communication event. If the updated settings are provided prior to the online communication event, the online connnunication event will execute at a future time using the updated settings. If the updated settings are provided during execution of the online communication event, the remainder of the online communication event may execute using the updated settings. This way, an event organizer, delegate, or other approved user can update event settings during an event from any computing device using the event settings hyperlink. For example, a user may have dialed into a web conference due to not having access to a computing system that can run a client for the web conference. While dialed-in, the user may select the event settings hyperlink on a mobile device, for example, and update the meeting settings through a web browser on the mobile device, for example. This provides much greater flexibility for online event organizers who do not always have access to a native client for a particular online communication event. In an example, the updated settings may be provided to other attendees (including, for example, updated attendees) prior to the event, such as when a time or date is changed. In another example, a setting may be updated without the need to send to other attendees (e.g., changing a setting to require or remove requirement of entering a password before accessing the event).

Figure 6:
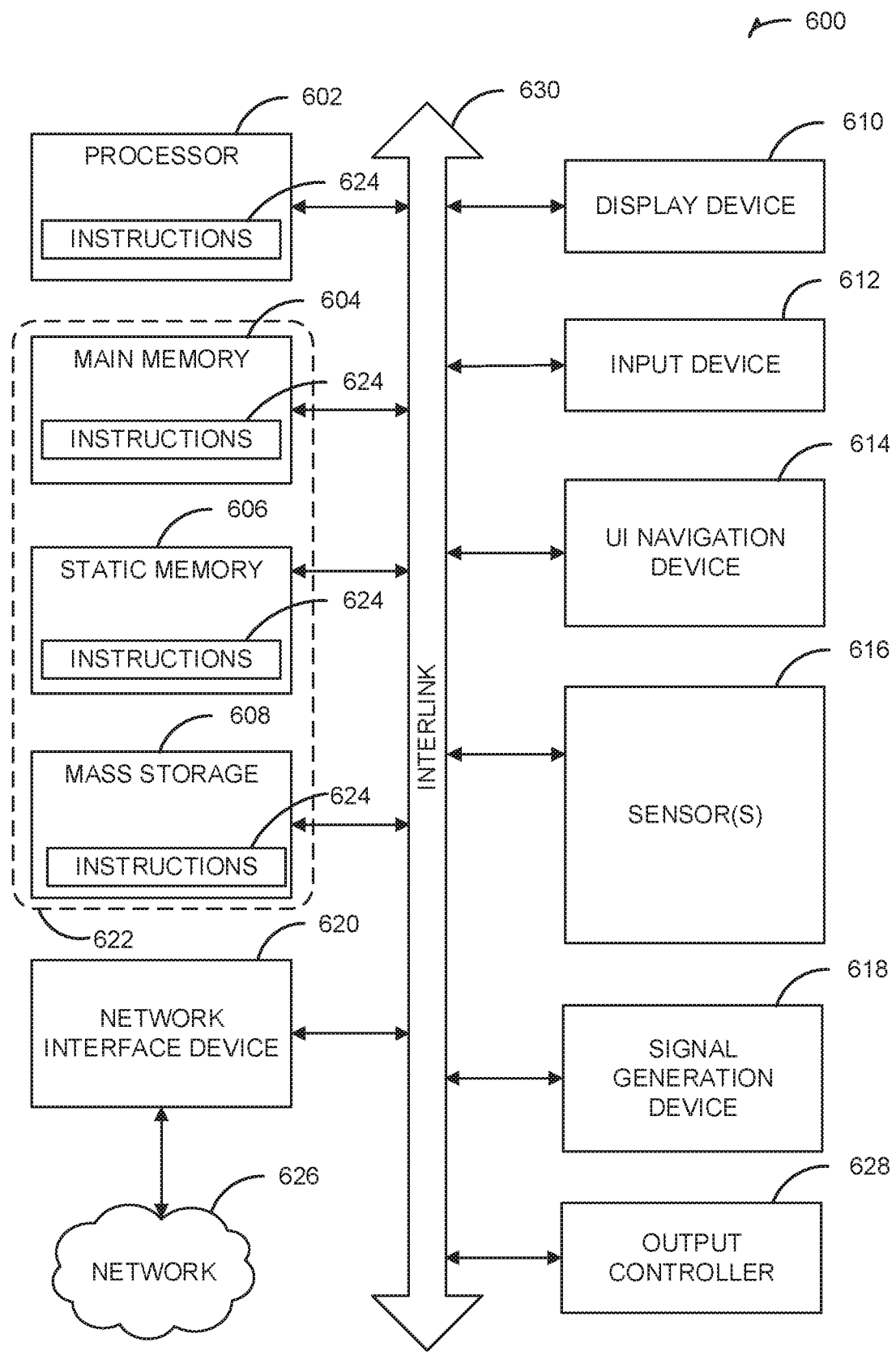
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. For example, the machine 600 can be any one or more of the servers 102, and/or computing devices 104, 106, and 108. Examples, as described herein, may include, or may operate by, logic or a number of components, or mechanisms in the machine 600. Circuitry (e.g., processing circuitry) is a collection of circuits implemented in tangible entities of the machine 600 that include hardware (e.g., simple circuits, gates, logic, etc). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 600 follow.

In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 600 may include a hardware processor 602 (e.g., a central processing unit (CPU), a graphics processing unit (CPU), a hardware processor core, or any combination thereof), a main memory 604, a static memory (e.g., memory or storage for firmware, microcode, a basic-input-output (BIOS), unified extensible firmware interface (UEFI), etc.) 606, and mass storage 608 (e.g., hard drive, tape drive, flash storage, or other block devices) some or all of which may communicate with each other via an interlink (e.g., bus) 630. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 608, a signal generation device 618 (e.g., a speaker), a network interface device 620, and one or more sensors 616, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc. connection to communicate or control one or more peripheral devices (e.g., a printer, card reader, etc.).

Registers of the processor 602, the main memory 604, the static memory 606, or the mass storage 608 may be, or include, a machine readable medium 622 on which is stored one or more sets of data structures or instructions 624 (e.g., software) embodying or utilized by any one or more of the techniques or functions described herein. The instructions 624 may also reside, completely or at least partially, within any of registers of the processor 602, the main memory 604, the static memory 606, or the mass storage 608 during execution thereof by the machine 600. In an example, one or any combination of the hardware processor 602, the main memory 604, the static memory 606, or the mass storage 608 may constitute the machine readable media 622. While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may be further transmitted or received over a communications network 626 using a transmission medium via the network interface device 620 utilizing any one of a number of transfer protocols (e.g., frame relay, internee protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.16.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software. A transmission medium is a machine readable medium.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method of providing access to event controls of an online communication event using a settings hyperlink, the method comprising:

using one or more hardware processors:
receiving event attributes for the online communication event;
scheduling the online communication event, the scheduling including generating an invitation for the scheduled online communication event that includes the settings hyperlink embedded in the invitation, the settings hyperlink comprising embedded event identity information identifying the scheduled online communication event, the settings hyperlink different than a meeting join hyperlink, the online communication event having associated event attributes comprising one of a lobby setting, a video setting, an audio setting, a chat setting, a bridge number setting, a designated presenter, an automated announcement, a meeting recording setting, sharing permission settings, or participation permission settings;
responsive to an access request generated through selection of the settings hyperlink by a computing device:

extracting the event identity information;
generating graphical user interface (GUI) descriptors using the event attributes, the event attributes accessed using the event identity information from the hyperlink;
transmitting the GUI descriptors to the computing device to cause event controls to be displayed through an interface on the computing device, the event controls permitting modification of one or more of the event attributes; and
receiving one or more updated attributes from the computing device selected via the event controls through the interface; and
causing the scheduled online communication event to be executed in accordance with the updated attributes.

2. The method of claim 1, further comprising:
verifying account information in response to receiving the access request; and
causing access to be granted to the event controls in response to verification of the account information.

3. The method of claim 2, wherein verifying the account information comprises:
obtaining account credentials for one or more accounts indicated by the event attributes;
receiving access credentials from the computing device; and
verifying the account information by confirming that the received access credentials match the account credentials.

4. The method of claim 1, wherein the access request is a first access request, the method further comprising:
receiving a second access request generated through selection of the settings hyperlink embedded in the invitation generated for the online communication event;
obtaining account credentials for one or more accounts indicated by the event attributes;
receiving access credentials from the computing device; and
denying access to the event controls in response to the received access credentials not matching the account credentials.

5. The method of claim 1, wherein causing the scheduled online communication event to be executed in accordance with the updated attributes comprises:
transmitting the updated attributes while the scheduled online communication event is currently executing; and
updating, by a remote system, the scheduled online communication event while the scheduled online communication event is currently executing.

6. The method of claim 1, wherein causing the scheduled online communication event to be executed in accordance with the updated attributes comprises:
transmitting the updated attributes to a remote system prior to execution of the online communication event.

7. The method of claim 1, wherein the online communication event is at least one of a video conference, teleconference, web meeting, or online chat.

8. The method of claim 1, wherein receiving the event attributes for the scheduled online communication event comprises receiving the event attributes from a remote computing system executing a scheduling application.

9. The method of claim 1, further comprising:
extracting the event identity information from an access request generated through an application executing on a remote device; and
transmitting the GUI descriptors to the remote device to cause the event controls to be displayed through an interface embedded in the application executing on the remote device.

10. A system for providing access to event controls of an online communication event using a settings hyperlink, the system comprising:
one or more hardware processors:
a memory, storing instructions, which when executed, cause the one or more hardware processors to perform operations comprising:
receiving event attributes for the online communication event;
scheduling the online communication event, the scheduling including generating an invitation for the scheduled online communication event that includes the settings hyperlink embedded in the invitation, the settings hyperlink comprising embedded event identity information identifying the scheduled online communication event, the settings hyperlink different than a meeting join hyperlink, the online communication event having associated event attributes comprising one of a lobby setting, a video setting, an audio setting, a chat setting, a bridge number setting, a designated presenter, an automated announcement, a meeting recording setting, sharing permission settings, or participation permission settings;
responsive to an access request generated through selection of the settings hyperlink by a computing device:
extracting the event identity information;
generating graphical user interface (GUI) descriptors using the event attributes, the event attributes accessed using the event identity information from the hyperlink;
transmitting the GUI descriptors to the computing device to cause event controls to be displayed through an interface on the computing device, the event controls permitting modification of one or more of the event attributes; and
receiving one or more updated attributes from the computing device selected via the event controls through the interface; and
causing the scheduled online communication event to be executed in accordance with the updated attributes.

11. The system of claim 10, the operations further comprising:
verifying account information in response to receiving the access request; and
causing access to be granted to the event controls in response to verification of the account information.

12. The system of claim 11, wherein the operations of verifying the account information comprises:
obtaining account credentials for one or more accounts indicated by the event attributes;
receiving access credentials from the computing device; and
verifying the account information by confirming that the received access credentials match the account credentials.

13. The system of claim 10, wherein the access request is a first access request, the operations further comprising:
receiving a second access request generated through selection of the settings hyperlink embedded in the invitation generated for the online communication event;
obtaining account credentials for one or more accounts indicated by the event attributes;

receiving access credentials from the computing device; and denying access to the event controls in response to the received access credentials not matching the account credentials.

14. The system of claim 10, wherein the operations of causing the scheduled online communication event to be executed in accordance with the updated attributes comprises:

transmitting the updated attributes while the scheduled online communication event is currently executing; and updating, by a remote system the scheduled online communication event while the scheduled online communication event is currently executing.

15. The system of claim 10, wherein the operations of causing the scheduled online communication event to be executed in accordance with the updated attributes comprises:

transmitting the updated attributes to a remote system prior to execution of the online communication event.

16. The system of claim 10, wherein the online communication event is at least one of a video conference, teleconference, web meeting, or online chat.

17. The system of claim 10, wherein the operations of receiving the event attributes for the scheduled online communication event comprises receiving the event attributes from a remote computing system executing a scheduling application.

18. The system of claim 10, the operations further comprising:

extracting the event identity information from an access request generated through an application executing on a remote device; and transmitting the GUI descriptors to the remote device to cause the event controls to be displayed through an interface embedded in the application executing on the remote device.

19. A system for providing access to event controls of an online communication event using a settings hyperlink, the system comprising:

one or more hardware processors:

a memory, storing instructions, which when executed, cause the one or more hardware processors to perform operations comprising:

means for receiving event attributes for the scheduled online communication event;

means for scheduling the online communication event, the scheduling including generating an invitation for the scheduled online communication event that includes the settings hyperlink embedded in the invitation, the settings hyperlink comprising embedded event identity information identifying the online communication event, the settings hyperlink different than a meeting join hyperlink, the online communication event having associated event attributes comprising one of a lobby setting, a video setting, an audio setting, a chat setting, a bridge number setting, a designated presenter, an automated announcement, a meeting recording setting, sharing permission settings, or participation permission settings;

responsive to an access request generated through selection of the settings hyperlink by a computing device:

means for extracting the event identity information;

means for generating graphical user interface (GUI) descriptors using the event attributes, the event attributes accessed using the event identity information from the hyperlink;

means for transmitting the GUI descriptors to the computing device to cause event controls to be displayed through an interface on the computing device, the event controls permitting modification of one or more of the event attributes; and means for receiving one or more updated attributes from the computing device selected via the event controls through the interface; and means for causing the scheduled online communication event to be executed in accordance with the updated attributes.

20. The system of claim 19, further comprising:

means for obtaining account credentials for one or more accounts indicated by the event attributes;

means for receiving access credentials from the computing device; and means for verifying account information by confirming that the received access credentials match the account credentials; and means for causing access to be granted to the event controls in response to verification of the account information.

* * * * *